United States Patent
Su et al.

(10) Patent No.: US 6,708,884 B1
(45) Date of Patent: Mar. 23, 2004

(54) METHOD AND APPARATUS FOR RAPID AND PRECISION DETECTION OF OMNIDIRECTIONAL POSTNET BARCODE LOCATION

(75) Inventors: Wei Su, Englishtown, NJ (US); Yun-Qing Shi, Millburn, NJ (US); Cheng-jyh Chang, Chung Ho (TW); Shu Lin, Indianapolis, IN (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/319,670

(22) Filed: Jun. 25, 2002

(51) Int. Cl.$^7$ .............................. G06K 7/10; G06K 9/18
(52) U.S. Cl. ............................ 235/462.09; 235/462.08; 235/462.02; 382/101
(58) Field of Search ..................... 235/462.09, 462.08, 235/462.1, 462.11, 462.02, 462.04, 462.25, 462.41, 462.01, 454, 470; 382/101, 102, 181, 190, 209, 289

(56) References Cited

U.S. PATENT DOCUMENTS

| | | | | |
|---|---|---|---|---|
| 4,822,986 A | * | 4/1989 | Guthmueller et al. .. | 235/462.02 |
| 5,073,954 A | * | 12/1991 | Van Tyne et al. ....... | 235/462.08 |
| 5,120,940 A | * | 6/1992 | Willsie ................... | 235/462.08 |
| 5,155,343 A | * | 10/1992 | Chandler et al. ...... | 235/462.09 |
| 5,155,344 A | | 10/1992 | Fardeau et al. | |
| 5,296,690 A | * | 3/1994 | Chandler et al. ........ | 235/462.1 |
| 5,319,181 A | * | 6/1994 | Shellhammer et al. . | 235/462.09 |
| 5,422,470 A | * | 6/1995 | Kubo ..................... | 235/462.09 |
| 5,428,211 A | * | 6/1995 | Zheng et al. .......... | 235/462.02 |
| 5,468,945 A | * | 11/1995 | Huggett et al. ........ | 235/462.02 |
| 5,489,769 A | * | 2/1996 | Kubo ..................... | 235/462.09 |
| 5,504,319 A | * | 4/1996 | Li et al. ................. | 235/462.08 |
| 5,563,955 A | * | 10/1996 | Bass et al. ................... | 382/101 |
| 6,123,262 A | * | 9/2000 | Shellhammer ......... | 235/462.09 |
| 6,176,428 B1 | * | 1/2001 | Joseph et al. ............ | 235/462.1 |
| 6,293,466 B1 | * | 9/2001 | Fujita et al. ........... | 235/462.02 |
| 6,367,698 B1 | * | 4/2002 | Yamamoto et al. .... | 235/462.11 |
| 2001/0006191 A1 | * | 7/2001 | Hecht et al. .......... | 235/462.16 |
| 2001/0035458 A1 | * | 11/2001 | Schum et al. .......... | 235/462.08 |

FOREIGN PATENT DOCUMENTS

JP           4-225487 A    *   8/1992

* cited by examiner

*Primary Examiner*—Karl D. Frech
*Assistant Examiner*—Jared J. Fureman
(74) *Attorney, Agent, or Firm*—Michael Zelenka; George B. Tereschuk

(57) ABSTRACT

A method for rapid and precise detecting of an omnidirectional postnet bar code on an object by digital signal processing is provided. In order to rapidly and accurately detect omnidirectional postnet bar codes, a two-dimensional digital image containing the postnet bar code is acquired, filtered and dilated to form a block dominated by a plurality of black-colored pixels. Then a down sampled image is provided and match filtered with a two-dimensional matched filtering output to indicate a best-matched filter, thus determining a postnet bar code location and orientation by associating matched filters with an orientation angle of the omnidirectional postnet bar code. The method further comprises the steps of identifying a gravity center for each short bar code and connecting the gravity centers to form a straight line by using a Hough transform and comparing the straight line with the postnet bar code location to generate a verification result and then detecting a position and an orientation of said postnet bar code location by matching said postnet bar code location with said verification result.

39 Claims, 4 Drawing Sheets

2A     2B     2C

METHOD AND APPARATUS FOR RAPID AND PRECISION DETECTION OF OMNIDIRECTIONAL POSTNET BARCODE LOCATION

GOVERNMENT INTEREST

The invention described herein may be manufactured, used, imported, sold, and licensed by or for the Government of the United States of America without the payment to us of any royalty thereon.

BACKGROUND OF THE INVENTION

1. Field of the Invention

The present invention relates in general to the field of detecting and locating bar codes, and more specifically to detecting and locating the position of a postnet type barcode with an omnidirectional location orientation.

2. Description of the Prior Art

Bar codes were introduced over twenty years ago and their use has spread from supermarkets to department stores, warehouses, factory floors, the military, health and insurance industries. They are one of the simplest printed patterns that can be reliably recognized by a computer. A typical bar code consists of a sequence of parallel solid lines or bars of varying width and spacing. The alternating light and dark areas defined by the bars and the spaces between the bars represent a digital code that serves to identify the content of the bar code symbol. After being read, the digital code is directly translated to a sequence of alphanumeric characters and, then by means of a data base, the digital code may be further translated to the common language description of the item bearing the object bar code label along with other pertinent data such as the current price of the item.

A bar code reader includes a scanner and a decoder. A scanner is the device that produces a signal representing the bars and spaces of a bar code. A decoder then converts the signal so that a computer will understand the signal. The light sources used in scanners are LED (Light Emitting Diode), CCD (Charge Coupled Device) and lasers in manufacturing and warehousing applications. A scanner produces a well-defined beam of light that is scanned across a bar code symbol by means such as an oscillating galvanometer mirror or a rotating polygon. Scattered light from the symbol is collected by an optical system and is incident on a photodetector in the scanner. The photodetector converts the light into a time-varying analog signal that is an electrical representation of the physical bar and space widths. Subsequent circuits convert this signal to a logic level pattern whose analog timing represents the bar code symbol. This pattern is sent to a microcomputer to determine the characters in the message represented by the symbol.

Types of Bar Codes

Several types of bar codes have been prevalently utilized in the commerce and industry. The most common one is the one-dimensional bar code, or 1-D bar code. 1-D bar codes encode information along one dimension with intervals of alternating diffuse reflectivity, usually of black and white color. Each interval is a rectangle whose vertical dimension, or height, carries no information but rather facilitates scanning. Usually the codes use a combination of bar/space ratio, the ratio of bar/space width to the narrowest bar/space width, to represent different information. FIG. 1 shows an example of a prior art Code 39 bar code with two different widths for the bar and the space. In the bar code system, a bar is defined as the element type with the lower reflectance, usually black, and a space is the element type with higher reflectance, usually white. Obviously, a higher bar allows more various scanning directions, and however, occupies more available space.

During the later 1980s and early 1990s two dimensional bar codes or 2-D symbols have been developed for automatic identification. A 2-D bar code contains significantly more data than a 1-D bar code. Many 2-D bar codes can carry as many as 2,000 characters of data in a single symbol as compared to a 1-D bar code capacity of 15 to 22 characters. Most 2-D bar codes have error correction; that is, mathematical formulas are embedded into the code that will reconstruct any missing portion of the symbol and recreate the missing data. This allows the symbol to be easily used in environments where symbol damage is likely.

FIGS. 2A–2C depict three 2-D bar code examples. FIG. 2A shows the Vericode type 2-D bar code used for individual part tracking to identify unique parts in an automotive assembly and contains a unique identifier number and other pertinent information applicable to the tracking process. FIG. 2B shows the PDF 417 bar code that can contain quality test data and a tracking sheet to define needed parts, processes and fabrication requirements. The FIG. 2C Maxicode is used for high speed sorting, routing and tracking of goods.

The following patent references provide useful background information:

Willsie, U.S. Pat. No. : 5,120,940 "Detection of Barcodes in Binary Images with Arbitrary Orientation," issued on June 91-D describes 1-D bar code recognition;

Chandler, et al., U.S. Pat. No. 5,155,343 "Omnidirectional Bar Code Reader with Method and Apparatus for Detection and Scanning A Bar Code Symbol," issued on Oct. 13, 1992 describes a 1-D bar code recognition technique;

Fardeau et al., U.S. Pat. No. 5,155,344 "Method and Device for Reading a Bar Code of Variable Orientation on a Substantially Motionless Medium," issued on Oct. 13, 1992 describes 1-D indexation bar code; and Van Tyne et al., U.S. Pat. No. 5,073,954 entitled "Bar Code Location And Recognition Processing System," issued on Dec. 17, 1991 describes recognition of a horizontal postnet bar code. The present invention discloses and claims methods and systems for detection of the omnidirectional located postnet barcode.

The postnet bar code is very useful for mail delivery. The postnet bar code, often called the one and a half dimension (1.5 D) barcode, has long and short bars representing a set of binary data that can be decoded to the zip code portion of an address. Unlike the 1-D and 2-D bar codes, the postnet long and short bars each have different heights, and the postnet bar code maintains the same bar width and interval between two consecutive bars. FIG. 3A shows the format of typical postnet bar code 10 having a width, w. FIG. 3B is an exploded side view of postnet bar code 10 depicting a long bar 11 and short bars 12 and 13, along with representative dimensions. The size relationship between the width of postnet bar code 10 and the heights for long bar 11 and short bars 12 and 13 limits possible variations of scanning direction, and requires high accuracy for automatic recognition of postnet bar codes. The inherent size relationships in postnet bar codes, and hence, the requirement for high accuracy in automatic character recognition, has caused a number of problems, limitations and shortcomings. These problems, particularly the lack of freedom for scanning direction, have created a long-standing need for more versatility in character recognition, called recognition robustness, and a larger angle of rotation angle. The present invention overcomes and resolves the long-standing problems, shortcomings, limitations and difficulties associated with bar height, lack of scanning direction and high accuracy by providing heretofore unavailable methods and apparatus for precision detection of postnet bar codes with an omnidirectional orientation and arbitrary placement on the object.

SUMMARY OF THE INVENTION

It is one object of the present invention to provide a method for automatic detection of the position of postnet barcode omnidirectionally located in a 2-D digital image.

It is one object of the present invention to provide an apparatus for automatic detection of the position of postnet barcode omnidirectionally located in a 2-D digital image.

To attain these and other advantages and objects, the present invention provides for methods for rapid and precise detecting of an omnidirectional postnet bar code on an object by digital signal processing, comprising the steps of image processing, image recognition, providing a down-sampled image, correlating an image with matched filtering, forming a multi-resolution image structure, generating correlation results from the match-filtering step, detecting a position and an orientation of the postnet bar code location by matching the postnet bar code location with a verification result, without suffering from any of the long-standing problems, shortcomings and limitations associated with scanning direction constraints and the high accuracy requirement. One possible embodiment of the methods of the present invention is a method of mail sorting that automatically sort magazines on a moving conveyor belt into different slots according to the address information contained in the postnet bar code.

The present invention also contemplates an omnidirectional postnet bar code detecting system that may be embodied in a computer-implemented apparatus or a computer-readable storage medium.

DETAILED DESCRIPTION OF THE INVENTION

Figure 1:
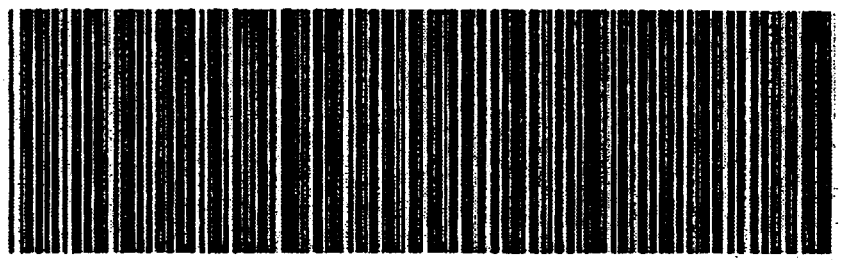
FIG. 1 is an example of a prior art one-dimensional bar code.
Figure 2:
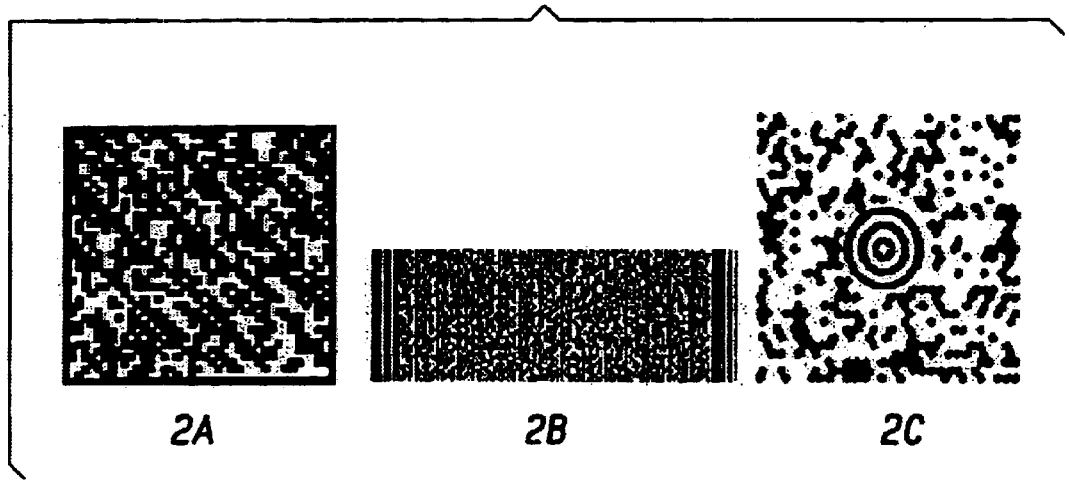
FIGS. 2A–2C depict examples of prior art two-dimensional bar codes
Figure 3A:
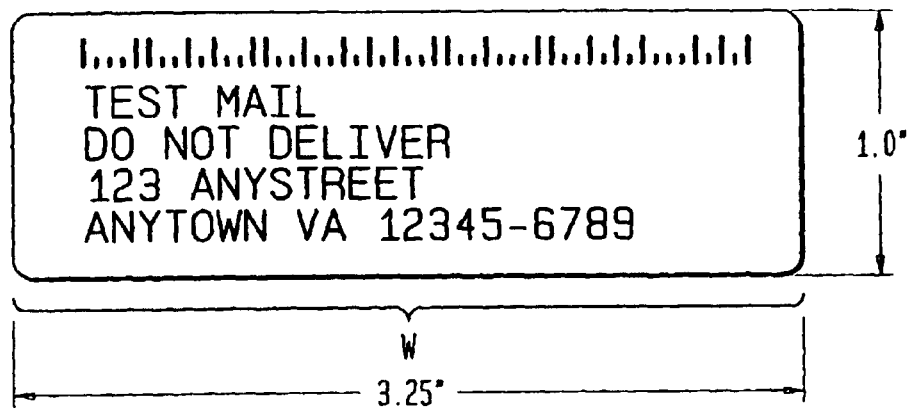
FIGS. 3A–3B depict a top and side views of a postnet bar codes
Figure 3B:
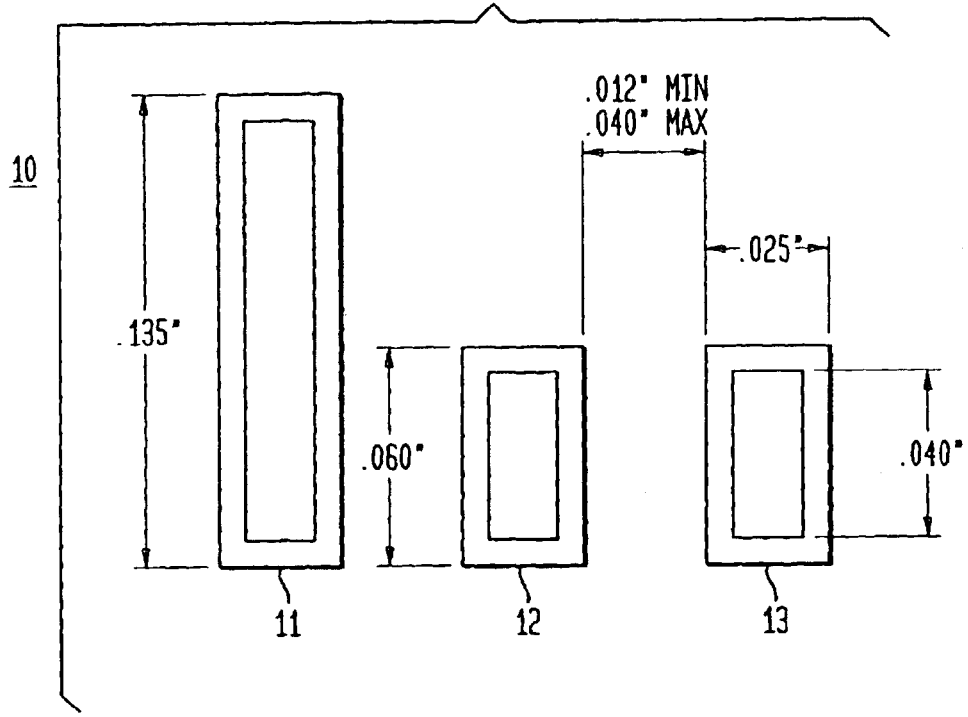
Figure 4:
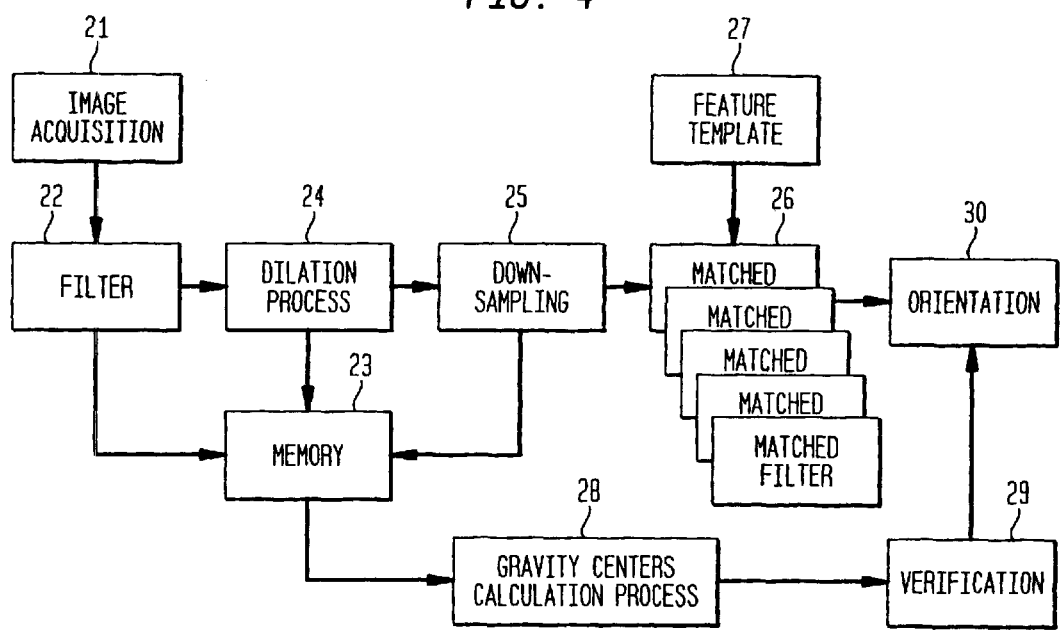
FIG. 4 is a flow diagram depicting the postnet barcode detection method of the present invention.

FIG. 4 is a flow diagram depicting the method for detecting an omnidirectional postnet bar code on an object by digital signal processing. The method of the present invention begins with a digital image acquisition step 21 performed by scanning an object displaying an omnidirectional barcode. The two-dimensional, or 2-D, image is represented by color-coded pixels and described by a data array $G_a(x,y,f)$, where $x=1,2, \ldots, M$ and $y=1,2, \ldots, N$ are pixel location indices. $f=2^L$, with L being a positive integer, is the index of color code for image intensity or color-map.

Each number in f represents a specific color. Since the postnet bar code is usually black or nearly black in color, a band pass filter is used during a filtering step 22, to remove all non-black-coded pixels from the 2-D image. If the pixel at (x,y) is within the cut off threshold of being "black," a binary number "1" is assigned to a memory device during a saving filtering output step 23. Otherwise, a binary number "0" is assigned. Without loss of generality, if index f=0, 1, . . . 255, the black color code is indexed by 100, and the bandwidth is 2, only the pixels with f values between 98 and 102 will be assigned to "1's." Thus, the processing complexity of the image will be largely reduced. The output of the filter is an M×N binary data array, denoted by $G_f$ and is saved to a memory device, such as a computer or data processing means, during the saving filtering output step 23. The memory device is also accessed during later steps of the method of this invention.

Figure 5:
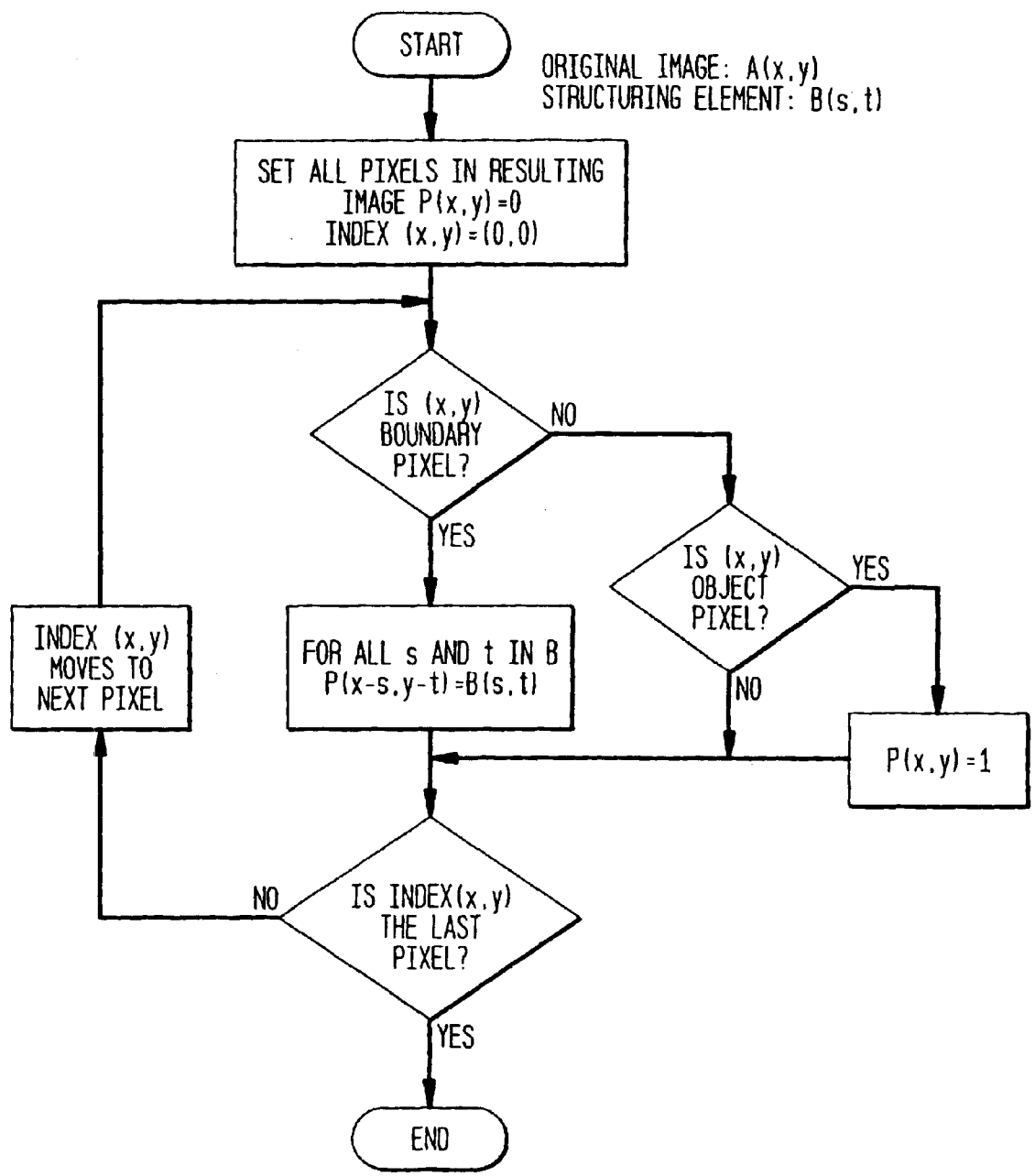
FIG. 5 is a computer programming flow chart of the dilation step of the present invention.

During the dilation step 24, the morphological technique called dilation is introduced to eliminate the noise and voids on the digital 2-D image. The dilation step 24 enhances the postnet bar code image to form a rectangular-like block dominated by black-colored pixels. This rectangular-like block is a unique pattern for image recognition. Referring now to FIG. 5, dilation step 24 is depicted up to binary array $G_f$. In FIG. 5, the starting point for dilation step 24 is to set all pixels in the resulting image and index, then determine if the pixel is a boundary pixel, object pixel, index pixel, or last pixel. Referring back to FIG. 4 now, the result of the dilation step 24 is denoted by the data array $G_d$ that has the same dimension as $G_f$ and is also saved to the memory device.

The next step in the method of this invention is a down-sampling step 25, which employs a multi-grid image processing technique to reduce the execution time of larger images and to reduce noise by averaging. The multi-grid process is implemented by software as shown in FIG. 5. The output of multi-grid process, which is denoted by array $G_m$, is also saved to the memory device. It is noted that $G_m$ is a low-resolution image with the dimension of $M_r$ and $N_r$, where, $M_r=M/r$, $N_r=M/r$, and r is a non-prime integer. $G_m$ takes much less memory space than $G_d$. The down-sampled image $G_m$ is match filtered with a set of two-dimensional matched filters to indicate a best-matched filter. The down-sampled image $G_m$ is then processed through a bank of seventy-two parallel pipelines, denoted by $T_{m0}, T_{m1}, T_{m2}, \ldots, Tm_{71}$, for 2-D matched filtering output during the matched filtering step 26. Each matched filter is associated with a unique orientation angle of the bar code. Assuming the matched filter $T_{m0}$ has zero degree orientation angle, the output of $T_{m0}$ will be computed by correlation $$c_0(s, t) = \sum_x \sum_y G_m(x, y) w_0(x - s, y - t),$$

where the coefficient array $w_0$ is chosen by training the known reference sample bar codes. The coefficient arrays $w_1, w_2, \ldots, w_{71}$ for matched filters $T_{m1}, T_{m2}, \ldots, T_{m71}$ are rotated versions of $T_{m0}$ which can either be pre-calculated and saved to memory or mathematically generated on-line from the coefficients of $T_{m0}$ by using rotating operation $$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}.$$

The match-filtering step 26 is performed with the much smaller image $G_m$ and the processing speed is much faster.

Skipping all non-black pixels, denoted by 0's in $G_m$, can further accelerate the match-filtering step 26. Let $c_{m0}$, $c_{m1}$, $c_{m2}$, ..., $c_{m71}$ be the maximum output of the matched filters $T_{m0}$, $T_{m1}$, $T_{m2}$, ..., $T_{m71}$, $c_{max}=\max\{c_{m0}, c_{m1}, c_{m2}, ..., c_{m71}\}$ is called the highest correlation score and the filter yields $c_{max}$, which is called the best-matched filter. The best-matched filter gives the position and orientation of the bar code denoted by $(x_{max}, y_{max}, w_{max})$, where, $(x_{max}, y_{max})$ indicates the image location where the best match was detected and $w_{max}$ indicate the angle of the postnet bar code. Fine-tuning the match-filtering step 26 around the vicinity of $x_{max}$, $y_{max}$ and $w_{max}$ may be needed to obtain more precise bar code location and rotation angle.

In a feature template step 27 the coefficients of matched filter $T_{m0}, T_{m1}, T_{m2}, ..., T_{m71}$ are generated by the seed $T_{m0}$ that is a $M_r \times N_r$-dimentional array with binary number "0's" and "1's." The preferred way to perform the feature template step 27 is the non-linear rotation method, wherein $T_{m1}, T_{m2}, ..., T_{m71}$ are shifted from $T_{m0}$ in various angles based on the probabilities of orientation angles. A linear method with fixed increments is also possible. For example, if the orientation angle is most likely horizontal, 0°, the incremental of rotation angle may be distributed by an exponential function. The elements of array $T_{m0}$ may be trained to emphasize the feature pixels of $G_m$ and ignore all non-feature pixels.

In a gravity centers calculation step 28, a spatial domain process will verify the position and orientation result obtained from the match-filtering step 26. Our experiments showed that the short bar code in postnet bar code has the feature properties of gravity centers. The spatial domain method is to calculate moments and inertials of the short bar code in the image array $G_f$ in order to identify the center of short bars. The moment is computed by $$\mu_{pq} = \sum_{i=1}^{M}\sum_{j=1}^{N}(i-c_x)^p(j-c_y)^q f(x,y)dxdy,$$

where $$m_{pq} = \sum_{i=1}^{M}\sum_{j=1}^{N} i^p j^q (i,j) \text{ and}$$

$$c_x = \frac{m_{10}}{m_{00}}, c_y = \frac{m_{01}}{m_{00}},$$

and the inertial is computed by $$I = \mu_{20} + \mu_{02}.$$

In a verification step 29, once he gravity centers are identified as being all short bars, a Hugh transform is used to connect the gravity centers to form a straight line. A verification result is used to verify the results obtained from the match-filtering step 26. During the orientation step 30, the position and orientation of the bar code is detected by matching with the verification result from verification step 29.

A number of variations of the method of the present invention are also within the contemplation of this invention, such as performing the digital image acquisition step 21 by photographing an object displaying an omnidirectional barcode, instead of scanning it, or performing the feature template step 27 with a linear method. Using a linear rotating approach, $T_{m1}, T_{m2}, ..., T_{m71}$ are generated by shift $T_{m0}$ with 5°, 10°, ..., 355°. Additionally, the elements of array $T_{m0}$ may be trained to emphasize the feature pixels of $G_m$ and ignore all non-feature pixels. Fine-tuning the match-filtering step 26 around the vicinity of $x_{max}$, $y_{max}$ and $w_{max}$ may be needed to obtain more precise bar code location and rotation angle. It is also possible to automate many or all of the steps of the method of the present invention so that a computer or data processing means performs the steps of the method of the present invention. Further, the method of the present invention also contemplates a method for mail sorting that automatically sort packages or magazines on a moving conveyor belt into different slots according to the address information contained in the postnet bar code.

The present invention can be embodied in the form of computer-implemented processes and apparatuses or systems for practicing those processes, or in the form of a computer program code embodied in tangible media, such as floppy diskettes, CD-ROMS, hard drives, or any other computer-readable storage medium, wherein the computer program code is loaded into and executed by a computer, or transmitted over some transmission medium, such as over electrical wiring or cabling, through fiber optics, or via electromagnetic radiation or the like, wherein, when the computer program code is loaded into and executed by a computer, the computer becomes an apparatus for practicing the invention.

Referring back to FIG. 4, the present invention contemplates a computer-readable medium whose contents cause a computer system to detect an omnidirectional postnet bar code on an object by digital signal processing, comprising, a means for image acquisition 21 generating a two-dimensional digital image of said omnidirectional postnet bar code, the digital image further comprising a plurality of color-coded pixels and the omnidirectional postnet bar code having a plurality of short bars, a means for filtering 22 removes a plurality of non-black coded pixels from the plurality of color-coded pixels to provide a filtering output, said filtering output being saved to a memory device 23 of the computer system, a means for dilating said two-dimensional digital image 24 forms a block dominated by a plurality of black-colored pixels, a means for down-samnpling 25 provides a down sampled image $G_m$, a means for matched filtering 26 processes said down-sampled image $G_m$ to provide a best-matched filter, the best-matched filter determines said postnet bar code location, said matched filtering means 26 associates a plurality of matched filters with an orientation angle of said omnidirectional postnet bar code, a feature template means 27 generates a plurality of coefficients, each of said plurality of short bar codes having a gravity center, a means for Hugh transform connects said gravity centers to form a straight line, said straight line being compared with said postnet bar code location to generate the verification result 29 and the verification result 29 is matched with said postnet bar code location in a means for orientation 30 to detect a position and said orientation of said postnet bar code location.

When implemented on a general-purpose microprocessor, the computer program code segments combine with the microprocessor to provide a unique device that operates analogously to specific logic circuits. Another embodiment of this invention is a storage medium encoded with machine-readable computer program code whose contents cause a computer system to detect a position and orientation of an omnidirectional postnet bar code on an object by digital signal processing to match a postnet bar code location with a verification result, comprising many of the elements of the embodiment that provides a computer-readable medium whose contents cause a computer system to detect an omnidirectional postnet bar code on an object by digital signal processing. The variations found in the method of the present invention are also applicable to the computer-readable medium and storage medium embodiments.

Additionally, while several embodiments have been illustrated and described, it will be obvious to those skilled in the art that various modifications may be made without departing from the spirit and scope of this invention.

What we claim is:

1. A method for detecting an omnidirectional postnet bar code on an object by digital signal processing, comprising the steps of:

acquiring a two-dimensional digital image of said omnidirectional postnet bar code, said two-dimensional digital image being represented by a plurality of color-coded pixels;

filtering said two-dimensional digital image with a means for filtering to remove a plurality of non-black coded pixels from said plurality of color-coded pixels and provide a filtering output;

saving said filtering output in a memory device;

dilating said two-dimensional digital image to form a block dominated by a plurality of black-colored pixels;

providing a down sampled image $G_m$;

match-filtering said down-sampled image $G_m$ with a set of two-dimensional matched filters to indicate a best-matched filter;

determining a an omnidirectional postnet bar code location;

associating a plurality of matched filters with an orientation angle of said omnidirectional postnet bar code;

generating a plurality of coefficients from said match-filtering step during a feature template step;

identifying a gravity center for each of a plurality of short bar codes and connecting said gravity centers to form a straight line;

comparing said straight line with said omnidirectional postnet bar code location to generate a verification result; and detecting a position and an orientation of said omnidirectional postnet bar code location by matching said omnidirectional postnet bar code location with said verification result.

2. The method for detecting an omnidirectional postnet bar code on an object by digital signal processing, as recited in claim 1, further comprising said filtering output including an M×N binary data array denoted by a $G_f$ factor from said filtering step.

3. The method for detecting an omnidirectional postnet bar code on an object by digital signal processing, as recited in claim 2, further comprising the step of assigning a binary number 0 to said plurality of non-black coded pixels.

4. The method for detecting an omnidirectional postnet bar code on an object by digital signal processing, as recited in claim 3, further comprising the step of assigning a binary number 1 to said plurality of black-coded pixels.

5. The method for detecting an omnidirectional postnet bar code on an object by digital signal processing, as recited in claim 4, wherein said block provides a rectangular block pattern for an image recognition pattern.

6. The method for detecting an omnidirectional postnet bar code on an object by digital signal processing, as recited in claim 5, further comprising the step of down sampling said two-dimensional digital image with a multi-grid data processing means.

7. The method for detecting an omnidirectional postnet bar code on an object by digital signal processing, as recited in claim 6, further comprising the step of match filtering said down-sampled image $G_m$ with a plurality of pipelines.

8. The method for detecting an omnidirectional postnet bar code on an object by digital signal processing, as recited in claim 7, further comprising the step of said best-matched filter determining said omnidirectional postnet bar code location.

9. The method for detecting an omnidirectional postnet bar code on an object by digital signal processing, as recited in claim 8, further comprising the step of a non-linear rotation during said feature template step.

10. The method for detecting an omnidirectional postnet bar code on an object by digital signal processing, as recited in claim 9, further comprising the step of a linear rotation during said feature template step.

11. The method for detecting an omnidirectional postnet bar code on an object by digital signal processing, as recited in claim 9, further comprising the step of forming said straight line by a Hugh transform.

12. The method for detecting an omnidirectional postnet bar code on an object by digital signal processing, as recited in claim 11, further comprising the step of acquiring said two-dimensional digital image by scanning said object.

13. The method for detecting an omnidirectional postnet bar code on an object by digital signal processing, as recited in claim 12, further comprising the step of eliminating noise in said two-dimensional digital image during the dilation step.

14. The method for detecting an omnidirectional postnet bar code on an object by digital signal processing, as recited in claim 13, further comprising the step of eliminating a plurality of voids in said two-dimensional digital image during the dilation step.

15. The method for detecting an omnidirectional postnet bar code on an object by digital signal processing, as recited in claim 14, further comprising said best-matched filter being determined by the formulas:

$$\text{let } c_{m0}, c_{m1}, c_{m2}, \ldots, c_{m71} \text{ be the maximum output of the matched filters } T_{m0}, T_{m1}, T_{m2}, \ldots, T_{m71},$$

$$c_{max} = \max\{c_{m0}, c_{m1}, c_{m2}, \ldots, c_{m71}\}$$

said $c_{max}$ being said best-matched filter.

16. The method for detecting an omnidirectional postnet bar code on an object by digital signal processing, as recited in claim 15, further comprising the step of calculating a plurality of moments and a plurality of inertials from the plurality of short bar codes.

17. The method for detecting an omnidirectional postnet bar code on an object by digital signal processing, as recited in claim 16, wherein packages are rapidly sorted into zip codes.

18. The method for detecting an omnidirectional postnet bar code on an object by digital signal processing, as recited in claim 17, further comprising automating said steps with computer equipment.

19. The method for detecting an omnidirectional postnet bar code on an object by digital signal processing, as recited in claim 11, further comprising the step of acquiring said two-dirnensional digital image by photographing said object.

20. A computer-readable medium whose contents cause a computer system to detect an omnidirectional postnet bar code on an object by digital signal processing, comprising:

a means for image acquisition generates a two-dimensional digital image of said omnidirectional postnet bar code;

said digital image further comprising a plurality of color-coded pixels;

said omnidirectional postnet bar code having a plurality of short bars;

a means for filtering removes a plurality of non-black coded pixels from said plurality of color-coded pixels to provide a filtering output, said filtering output being saved to a memory device of said computer system;

a means for dilating said two-dimensional digital image forms a block dominated by a plurality of black-colored pixels;

a means for down-sampling provides a down sampled image $G_m$;

a means for matched filtering processes said down-sampled image $G_m$ to provide a best-matched filter;

said best-matched filter determines said omnidirectional postnet bar code location;

said matched filtering means associates a plurality of matched filters with an orientation angle of said omnidirectional postnet bar code;

a feature template means generates a plurality of coefficients;

each of said plurality of short bar codes having a gravity center;

a means for Hugh transform connects said gravity centers to form a straight line, said straight line being compared with said omnidirectional postnet bar code location to generate said verification result; and said verification result is matched with said omnidirectional postnet bar code location by a means for orientation to detect a position and said orientation of said omnidirectional postnet bar code location.

21. The computer-readable medium whose contents cause a computer system to detect an omnidirectional postnet bar code on an object by digital signal processing, as recited in claim 20, further comprising said filtering output including an M×N binary data array denoted by a $G_f$ factor from said filtering means.

22. The computer-readable medium whose contents cause a computer system to detect an omnidirectional postnet bar code on an object by digital signal processing, as recited in claim 21, further comprising said block provides a rectangular block pattern for an image recognition pattern.

23. The computer-readable medium whose contents cause a computer system to detect an omnidirectional postnet bar code on an object by digital signal processing, as recited in claim 22, further comprising down sampling said two-dimensional digital image with a multi-grid data processing means.

24. The computer-readable medium whose contents cause a computer system to detect an omnidirectional postnet bar code on an object by digital signal processing, as recited in claim 23, further comprising said match filtering means match filters said down-sampled image $G_m$ with a set of two-dimensional matched filters to indicate said best-matched filter.

25. The computer-readable medium whose contents cause a computer system to detect an omnidirectional postnet bar code on an object by digital signal processing, as recited in claim 24, further comprising a non-linear rotation after said plurality of coefficients are generated.

26. The computer-readable medium whose contents cause a computer system to detect an omnidirectional postnet bar code on an object by digital signal processing, as recited in claim 25, further comprising transferring said contents of the computer-readable medium over a computer network.

27. The computer-readable medium whose contents cause a computer system to detect an omnidirectional postnet bar code on an object by digital signal processing, as recited in claim 26, further comprising said best-matched filter being determined by the formulas:

let $c_{m0}, c_{m1}, c_{m2}, \ldots, c_{m71}$ be the maximum output of the matched filters $T_{m0}, T_{m1}, T_{m2}, \ldots, T_{m71}$, $c_{max} = \max\{c_{m0}, c_{m1}, c_{m2}, \ldots, c_{m71}\}$ said $c_{max}$ being said best-matched filter.

28. The computer-readable medium whose contents cause a computer system to detect an omnidirectional postnet bar code on an object by digital signal processing, as recited in claim 27, wherein packages are rapidly sorted into zip codes.

29. The computer-readable medium whose contents cause a computer system to detect an omnidirectional postnet bar code on an object by digital signal processing, as recited in claim 24, further comprising a linear rotation after said plurality of coefficients are generated.

30. A storage medium encoded with machine-readable computer program code whose contents cause a computer system to detect a position and orientation of an omnidirectional postnet bar code on an object by digital signal processing to match a omnidirectional postnet bar code location with a verification result, comprising:

a means for image acquisition generates a two-dimensional digital image of said omnidirectional postnet bar code;

said two-dimensional digital image further comprising a plurality of color-coded pixels;

said omnidirectional postnet bar code having a plurality of short bar bars;

a means for filtering removes a plurality of non-black coded pixels from said plurality of color-coded pixels to provide a filtering output, said filtering output being saved to a memory device of said computer system;

a means for dilating said two-dimensional digital image forms a block dominated by a plurality of black-colored pixels;

a means for multi-grid image processing provides a down sampled image $G_m$;

a means for matched filtering match filters said down-sampled image $G_m$ with a set of two-dimensional matched filters provides a best-matched filter;

said best-matched filter determines said omnidirectional postnet bar code location;

said matched filtering means associates a plurality of matched filters with an orientation angle of said omnidirectional postnet bar code;

a feature template means generates a plurality of coefficients;

each of said plurality of short bar codes having a gravity center;

a means for Hugh transform connects said gravity centers to form a straight line, said straight line being compared with said omnidirectional postnet bar code location to generate said verification result; and said verification result is matched with said omnidirectional postnet bar code location to detect a position and said orientation of said omnidirectional postnet bar code location.

31. The storage medium encoded with machine-readable computer program code whose contents cause a computer system to detect a position and orientation of an omnidirectional postnet bar code, as recited in claim 30, further comprising said filtering output including a M×N binary data array denoted by a $G_f$ factor from said filtering means.

32. The storage medium encoded with machine-readable computer program code whose contents cause a computer system to detect a position and orientation of an omnidirectional postnet bar code, as recited in claim 31, further comprising said block provides a rectangular block pattern for an image recognition pattern.

33. The storage medium encoded with machine-readable computer program code whose contents cause a computer system to detect a position and orientation of an omnidirectional postnet bar code, as recited in claim 32, further comprising down sampling said two-dimensional digital image with a multi-grid data processing means.

34. The storage medium encoded with machine-readable computer program code whose contents cause a computer system to detect a position and orientation of an omnidirectional postnet bar code, as recited in claim 33, further comprising said match filtering means filters said down sampled image $G_m$ with a set of two-dimensional matched filters indicating said best-matched filter.

35. The storage medium encoded with machine-readable computer program code whose contents cause a computer system to detect a position and orientation of an omnidirectional postnet bar code, as recited in claim 34, further comprising a non-linear rotation after said plurality of coefficients are generated.

36. The storage medium encoded with machine-readable computer program code whose contents cause a computer system to detect a position and orientation of an omnidirectional postnet bar code, as recited in claim 35, further comprising transferring said machine-readable computer program code over a computer network.

37. The storage medium encoded with machine-readable computer program code whose contents cause a computer system to detect a position and orientation of an omnidirectional postnet bar code, as recited in claim 36, further comprising said best-matched filter being determined by the formulas:

$$\text{let } c_{m0}, c_{m1}, c_{m2}, \ldots, c_{m71} \text{ be the maximum output of the matched filters } T_{m0}, T_{m1}, T_{m2}, \ldots, T_{m71},$$

$$c_{max} = \max\{c_{m0}, c_{m1}, c_{m2}, \ldots, c_{m71}\}$$

said $c_{max}$ being said best-matched filter.

38. The storage medium encoded with machine-readable computer program code whose contents cause a computer system to detect a position and orientation of an omnidirectional postnet bar code, as recited in claim 37, wherein packages are rapidly sorted into zip codes.

39. The storage medium encoded with machine-readable computer program code whose contents cause a computer system to detect a position and orientation of an omnidirectional postnet bar code, as recited in claim 34, further comprising a linear rotation after said plurality of coefficients are generated.

* * * * *